US 12,109,623 B2

(12) United States Patent
Pechstein et al.

(10) Patent No.: US 12,109,623 B2
(45) Date of Patent: Oct. 8, 2024

(54) PORTABLE PIPE THREADER

(71) Applicant: MILWAUKEE ELECTRIC TOOL CORPORATION, Brookfield, WI (US)

(72) Inventors: Joseph J. Pechstein, West Bend, WI (US); Sean T. Kehoe, Hartland, WI (US); Aaron Grode, Germantown, WI (US); Timothy Hilger, Waterford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 516 days.

(21) Appl. No.: 17/086,755

(22) Filed: Nov. 2, 2020

(65) Prior Publication Data

US 2021/0129228 A1    May 6, 2021

Related U.S. Application Data

(60) Provisional application No. 62/929,462, filed on Nov. 1, 2019.

(51) Int. Cl.
*B23G 1/24* (2006.01)
*B23B 27/06* (2006.01)

(52) U.S. Cl.
CPC .............. *B23B 27/065* (2013.01); *B23G 1/24* (2013.01); *B23B 2215/68* (2013.01); *B23B 2215/72* (2013.01)

(58) Field of Classification Search
CPC ... B23G 1/24; B23G 2240/12; B23G 2240/40
See application file for complete search history.

(56) References Cited

U.S. PATENT DOCUMENTS

| 1,527,185 A | 2/1925 | Hall |
| 1,831,957 A | 11/1931 | Harrison |
| 1,956,182 A | 4/1934 | Thewes |
| 1,966,124 A | 7/1934 | Kimlin et al. |

(Continued)

FOREIGN PATENT DOCUMENTS

| CN | 101758305 A | 6/2010 |
| CN | 102513618 B | 9/2014 |

(Continued)

OTHER PUBLICATIONS

International Search Report and Written Opinion for Application No. PCT/US2021/025137 dated Jul. 22, 2021 (12 pages).

(Continued)

*Primary Examiner* — Alan Snyder
(74) *Attorney, Agent, or Firm* — Michael Best & Friedrich LLP

(57) ABSTRACT

A portable pipe threader includes a stand upon which a pipe is supported, a carriage supported by the stand, and a plurality of pipe threading tools coupled to the carriage and selectively operable to perform work on the pipe. The portable pipe threader further includes a drive assembly mounted to the stand including a brushless direct current ("DC") motor operable to provide torque to one of the pipe or a selected one of the pipe threading tools to rotate the pipe and the selected one of the pipe threading tools relative to each other, and a battery pack supported by the stand in selective electrical communication with the motor to provide electrical power to the motor.

21 Claims, 6 Drawing Sheets

(56) References Cited

U.S. PATENT DOCUMENTS

| | | |
|---|---|---|
| 1,973,231 A | 9/1934 | Thewes |
| 2,004,639 A | 6/1935 | Thewes |
| 2,076,831 A | 4/1937 | Thewes |
| 2,110,099 A | 3/1938 | Thewes |
| 2,205,148 A | 6/1940 | Mayotte |
| 2,219,721 A | 10/1940 | Ingwer et al. |
| 2,242,954 A | 5/1941 | Ingwer |
| 2,255,009 A | 9/1941 | Ingwer |
| 2,304,027 A | 12/1942 | Sellmeyer |
| 2,350,313 A | 5/1944 | Ingwer et al. |
| 2,374,176 A | 4/1945 | Cook |
| 2,581,702 A | 1/1952 | Quijada |
| 2,591,389 A | 4/1952 | Wallace |
| 2,600,776 A | 6/1952 | Ingwer |
| 2,678,453 A | 5/1954 | Rudolph |
| 2,680,256 A | 6/1954 | Ingwer et al. |
| 2,680,861 A | 6/1954 | Ingwer et al. |
| 2,693,966 A | 11/1954 | Chasar |
| 2,745,670 A | 5/1956 | Janik |
| 2,753,575 A | 7/1956 | Ingwer |
| 2,768,550 A | 10/1956 | Ingwer et al. |
| 2,778,652 A | 1/1957 | Ingwer et al. |
| 2,891,799 A | 6/1959 | Janik |
| 2,916,749 A | 12/1959 | Ingwer et al. |
| 2,996,737 A | 8/1961 | Bjalme |
| 3,002,205 A | 10/1961 | Buyer |
| 3,009,178 A | 11/1961 | Buyer |
| 3,012,792 A | 12/1961 | Bjalme |
| 3,049,737 A | 8/1962 | Weibel |
| 3,082,445 A | 3/1963 | Buyer |
| 3,095,772 A | 7/1963 | Ingwer |
| 3,188,666 A | 6/1965 | Brown, Sr. et al. |
| 3,232,629 A | 2/1966 | Obear |
| 3,270,592 A | 9/1966 | Behnke |
| 3,316,571 A | 5/1967 | Cutrone |
| 3,371,258 A | 2/1968 | Brown |
| 3,398,966 A | 8/1968 | Chalfant et al. |
| 3,413,667 A | 12/1968 | Behnke |
| 3,427,672 A | 2/1969 | Frank |
| 3,456,956 A | 7/1969 | Herbkersman |
| 3,521,313 A | 7/1970 | Baker |
| 3,526,411 A | 9/1970 | Chalfant et al. |
| 3,562,827 A | 2/1971 | Janik |
| 3,610,640 A | 10/1971 | Bollin et al. |
| 3,811,145 A | 5/1974 | Fink |
| 3,864,774 A | 2/1975 | Fohl |
| 3,995,869 A | 12/1976 | Mazingue |
| 4,002,960 A | 1/1977 | Brookfield et al. |
| 4,209,274 A | 6/1980 | Martin et al. |
| 4,213,722 A | 7/1980 | Wagner |
| 4,225,273 A | 9/1980 | Womack |
| 4,247,124 A | 1/1981 | Wagner |
| 4,275,490 A | 6/1981 | Bivins |
| 4,276,490 A | 6/1981 | Saldinger |
| 4,279,182 A | 7/1981 | Miyagawa et al. |
| 4,338,556 A | 7/1982 | Hetzel |
| 4,402,423 A | 9/1983 | Skowronski et al. |
| 4,536,000 A | 8/1985 | Röhm |
| 4,581,783 A | 4/1986 | Hayes et al. |
| 4,606,249 A | 8/1986 | Hayes et al. |
| 4,613,260 A | 9/1986 | Hayes et al. |
| 4,692,071 A | 9/1987 | Hirota |
| 4,752,163 A | 6/1988 | Fedor |
| 4,757,598 A | 7/1988 | Redman |
| 4,787,531 A | 11/1988 | Gress |
| D299,466 S | 1/1989 | Hayes et al. |
| 4,795,175 A | 1/1989 | Babb et al. |
| 4,808,047 A | 2/1989 | Calevich et al. |
| 4,811,639 A | 3/1989 | Gress et al. |
| 4,819,527 A | 4/1989 | Redman |
| 5,002,440 A | 3/1991 | Tamaoki et al. |
| 5,074,176 A | 12/1991 | Redman et al. |
| 5,076,744 A | 12/1991 | Kitagawa et al. |
| 5,087,013 A | 2/1992 | Gress et al. |
| 5,158,404 A | 10/1992 | Samas et al. |
| 5,199,928 A | 4/1993 | Gress et al. |
| 5,560,582 A | 10/1996 | Beelen |
| 5,826,469 A | 10/1998 | Haradem |
| 5,890,852 A | 4/1999 | Gress |
| 6,439,087 B1 | 8/2002 | Haas |
| 6,471,220 B1 | 10/2002 | Babb |
| 7,958,805 B2 | 6/2011 | Rigolone et al. |
| 8,047,923 B2 | 11/2011 | Emerson |
| 9,015,915 B1* | 4/2015 | Soltys ............... B23Q 11/0067 29/33 T |
| 9,095,917 B2 | 8/2015 | Patil et al. |
| 9,138,818 B2 | 9/2015 | Kundracik et al. |
| 9,370,835 B2 | 6/2016 | Kundracik et al. |
| 9,796,033 B2 | 10/2017 | Kundracik et al. |
| 10,016,830 B2 | 7/2018 | Hamm et al. |
| 10,239,140 B2 | 3/2019 | Kundracik et al. |
| 10,668,548 B2 | 6/2020 | Kundracik et al. |
| 2003/0024357 A1 | 2/2003 | Hofmann et al. |
| 2008/0210062 A1 | 9/2008 | Nitchman et al. |
| 2009/0248188 A1 | 10/2009 | Haas et al. |
| 2015/0165534 A1 | 6/2015 | Hamm |
| 2016/0256943 A1* | 9/2016 | Kundracik ............... B23G 1/52 |
| 2017/0021469 A1* | 1/2017 | Sailing ..................... B23G 1/44 |
| 2017/0100791 A1 | 4/2017 | Hamm et al. |
| 2017/0259357 A1 | 9/2017 | Choi |
| 2018/0147713 A1 | 5/2018 | Schmauder et al. |
| 2019/0006980 A1 | 1/2019 | Sheeks et al. |
| 2019/0044110 A1 | 2/2019 | Sheeks et al. |

FOREIGN PATENT DOCUMENTS

| | | |
|---|---|---|
| CN | 204035722 U | 12/2014 |
| CN | 104942382 A | 9/2015 |
| CN | 204770999 U | 11/2015 |
| CN | 105171145 A | 12/2015 |
| CN | 104588792 B | 2/2017 |
| CN | 107378015 A | 11/2017 |
| CN | 107511539 A | 12/2017 |
| CN | 208067512 U | 11/2018 |
| CN | 109773283 A | 5/2019 |
| CN | 209094723 U | 7/2019 |
| CN | 206509598 U | 9/2019 |
| CN | 109226911 B | 2/2020 |
| DE | 1527169 A1 | 7/1969 |
| DE | 1527175 B1 | 12/1970 |
| DE | 20016924 U1 | 12/2000 |
| DE | 102010003807 A1 | 10/2011 |
| EP | 1524058 A2 | 4/2005 |
| EP | 1907172 B1 | 5/2015 |
| EP | 3222379 A1 | 9/2017 |
| EP | 2605879 B1 | 8/2019 |
| EP | 3584027 B1 | 7/2020 |
| JP | 2019048371 A | 3/2019 |
| WO | 2010018409 A2 | 2/2010 |
| WO | 2019006452 A2 | 1/2019 |

OTHER PUBLICATIONS

Ridgid Tools, "Model 535A Automatic Threading Machine," <https://www.ridgid.com/us/en/535a-automatic-threading-machine> web page publicly available at least as early as Nov. 1, 2020.

Teledyne Oster, "Power Threaders," Catalog No. 77, Copyright 1976 (28 pages).

Wheeler Mfg., "Universal Dies/Die Heads are suited for in-place threading," <https://news.thomasnet.com/fullstory/universal-dies-die-heads-are-suited-for-in-place-threading-29007> press release dated Dec. 12, 2003.

International Search Report and Written Opinion for Application No. PCT/US2020/058503 dated Feb. 22, 2021 (11 pages).

Extended European Search Report for Application No. 20882631.3 dated Feb. 29, 2024 (9 pages).

Partial Supplementary European Search Report for Application No. 21780529.0 dated Apr. 30, 2024 (14 pages).

* cited by examiner

PORTABLE PIPE THREADER

CROSS-REFERENCE TO RELATED APPLICATIONS

This application claims priority to U.S. Provisional Patent Application No. 62/929,462 filed on Nov. 1, 2019, the entire content of which is incorporated herein by reference.

FIELD OF THE INVENTION

The present invention relates to pipe threaders, and more particularly to portable pipe threaders.

BACKGROUND OF THE INVENTION

Portable pipe threaders include a stand and a carriage mounted to the stand having multiple pipe threading tools. These tools are usually a die holder including multiple dies, a cutter, and a reamer. Typically, a motor transmits torque to a spindle to which a pipe is clamped for rotating the pipe with respect to the tools. The motor is an AC motor that receives power from a remote power source (e.g., via a power cord) and is usually controlled using a pedal, which upon actuation, triggers the motor to begin rotating the pipe. During use, the thread-cutting dies, or other pipe threading tools, heat up and require lubrication. Some portable pipe threaders have an onboard lubrication system to lubricate the dies as the threads are being cut on the pipe, while others rely upon the operator to manually lubricate the dies with a hand-operated pump.

SUMMARY OF THE INVENTION

The present invention provides, in one aspect, a portable pipe threader including a stand upon which a pipe is supported, a carriage supported by the stand, and a plurality of pipe threading tools coupled to the carriage and selectively operable to perform work on the pipe. The portable pipe threader further includes a drive assembly mounted to the stand including a brushless direct current ("BLDC") motor operable to provide torque to one of the pipe or a selected one of the pipe threading tools to rotate the pipe and the selected one of the pipe threading tools relative to each other, and a battery pack supported by the stand in selective electrical communication with the motor to provide electrical power to the motor.

The present invention provides, in another aspect, a portable pipe threader including a stand upon which a pipe is supported, a carriage supported by the stand, a spindle mounted to the carriage for clamping the pipe against rotation, and a plurality of pipe threading tools coupled to the carriage and selectively operable to perform work on the pipe. The portable pipe threader further includes a drive assembly mounted to the stand including a plurality of brushless direct current motors mounted to the respective plurality of pipe threading tools being operable to provide torque to a selected one of the pipe threading tools to rotate the selected one of the pipe threading tools relative to the stationary pipe, and a battery pack supported by the stand and in selective electrical communication with the motors to provide electrical power to the motors.

The present invention provides, in yet another aspect, a portable pipe threader including a stand upon which a pipe is supported, a carriage supported by the stand having a lubrication port, and a plurality of pipe threading tools coupled to the carriage and selectively operable to perform work on the pipe. The portable pipe threader further includes a drive assembly mounted to the stand including a brushless direct current motor operable to provide torque to one of the pipe or a selected one of the pipe threading tools, and a lubrication system in selective fluid communication with the lubrication port for providing a lubricant to the pipe or the pipe threading tools. The portable pipe threader further includes a battery pack supported by the stand configured to provide electrical power to the motor and the lubrication system.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
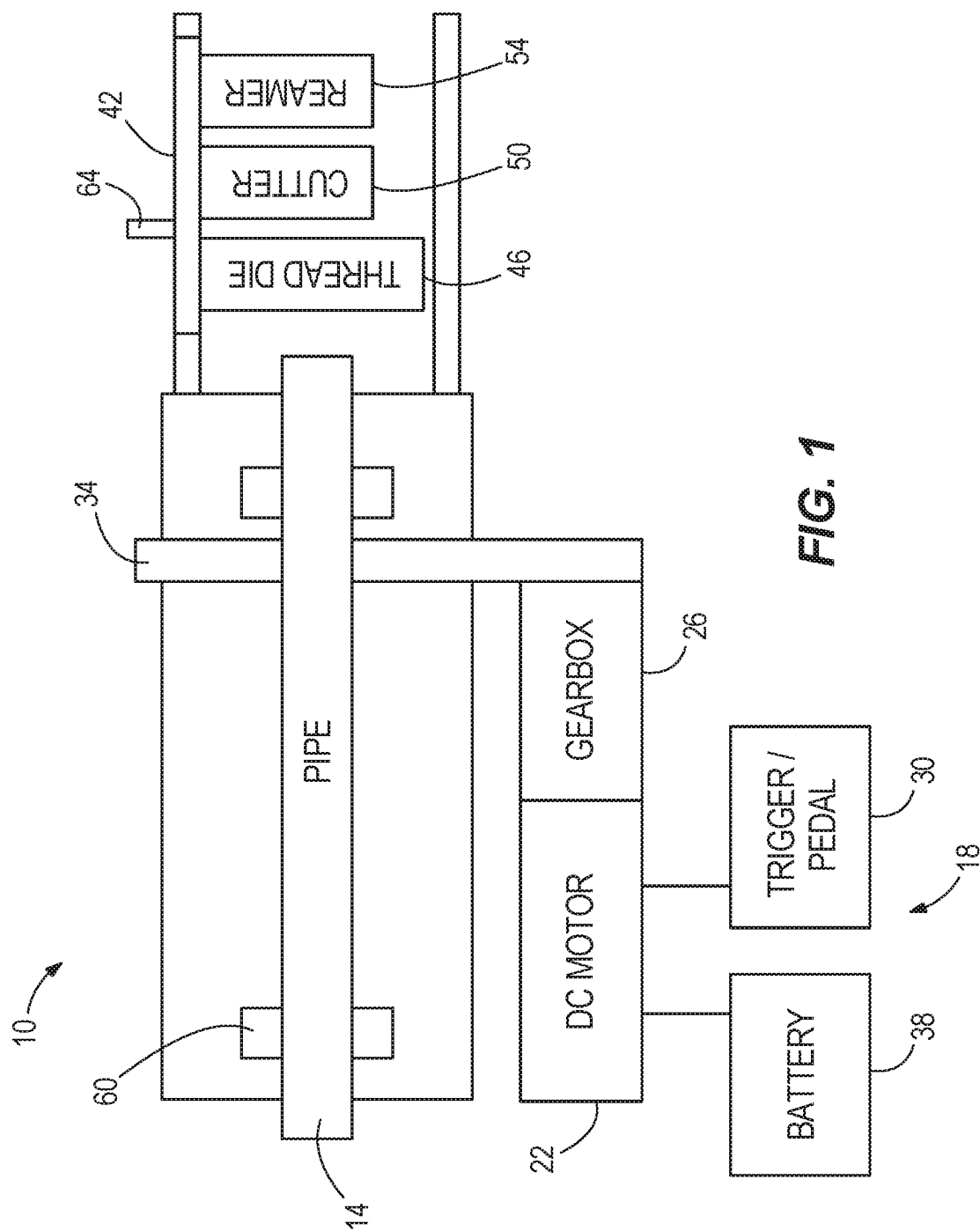
FIG. 1 is a top view of a portable pipe threader in accordance with an embodiment of the invention.

With reference to FIG. 1, a portable pipe threader 10 includes a stand 68 (FIG. 5) and a carriage 42 supported by the stand 68 having a plurality of pipe threading tools 46, 50, 54 supported by the carriage 42. The pipe threader 10 further includes a drive assembly 18 mounted to the stand 68 having a motor 22 (e.g. a brushless direct current motor), a gear box 26 coupled to the motor 22 having an output gear (not shown), and an electronic speed selection switch, such as a pedal 30, that selectively controls the drive assembly 18. The drive assembly 18 is powered by a battery pack 38 supported by the stand 68 in selective electrical communication with the motor 22 to provide electrical power to the motor 22. In some constructions, the battery pack 38 and the motor 22 can be configured as an 18 Volt high power battery pack and motor, such as the 18 Volt high power system disclosed in U.S. patent application Ser. No. 16/045,513 filed on Jul. 25, 2018 (now U.S. Patent Application Publication No. 2019/0044110), the entirety of which is incorporated herein by reference. In other constructions, the battery pack 38 and the motor 22 can be configured as an 80 Volt high power battery pack and motor, such as the 80 Volt battery pack and motor disclosed in U.S. patent application Ser. No. 16/025,491 filed on Jul. 2, 2018 (now U.S. Patent Application Publication No. 2019/0006980), the entirety of which is incorporated herein by reference. In such a battery pack 38, the battery cells within the battery pack 38 have a nominal voltage of up to about 80 V. In some embodiments, the battery pack 38 has a weight of up to about 6 lb. In some embodiments, each of the battery cells has a diameter of up to 21 mm and a length of up to about 71 mm. In some embodiments, the battery pack 38 includes up to twenty battery cells. In some embodiments, the battery cells 38 are connected in series. In some embodiments, the battery cells are operable to output a sustained operating discharge current of between about 40 A and about 60 A. In some embodiments, each of the battery cells has a capacity of between about 3.0 Ah and about 5.0 Ah. And, in some embodiments of the motor 22 when used with the 80 Volt battery pack 38, the motor 22 has a power output of at least about 2760 W and a nominal outer diameter (measured at the stator) of up to about 80 mm.

With reference to FIG. 1, the drive assembly 18 further includes a drive element 34 (e.g., a belt) coupled to the gear box 26 and powered by the motor 22. The motor 22 is configured to supply torque to the output gear of the gear box 26, rotatably driving the drive element 34 to rotate a pipe 14 or a selected one of the plurality of pipe threading tools. The pedal 30 is operable to activate the motor 22 and control a relative speed at which the pipe 14 rotates. In other embodiments, the relative speed at which the pipe 14 rotates can be selected using an electronic speed selection switch other than the pedal 30 (e.g., dial, key pad, button, etc.; not shown).

Figure 4:
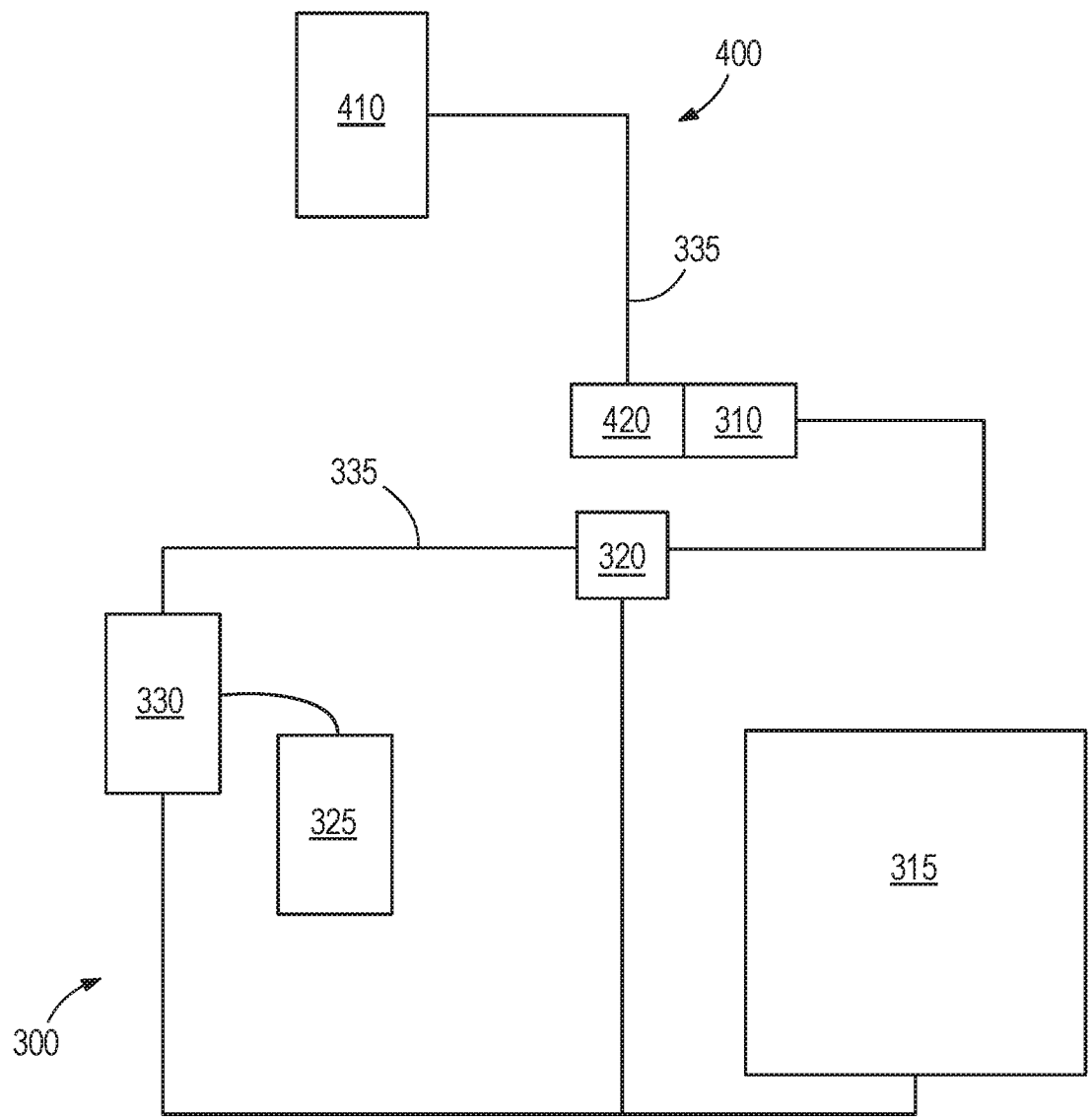
FIG. 4 is a schematic view of a lubrication system for use with any of the portable pipe threaders of FIGS. 1-3.
Figure 5:
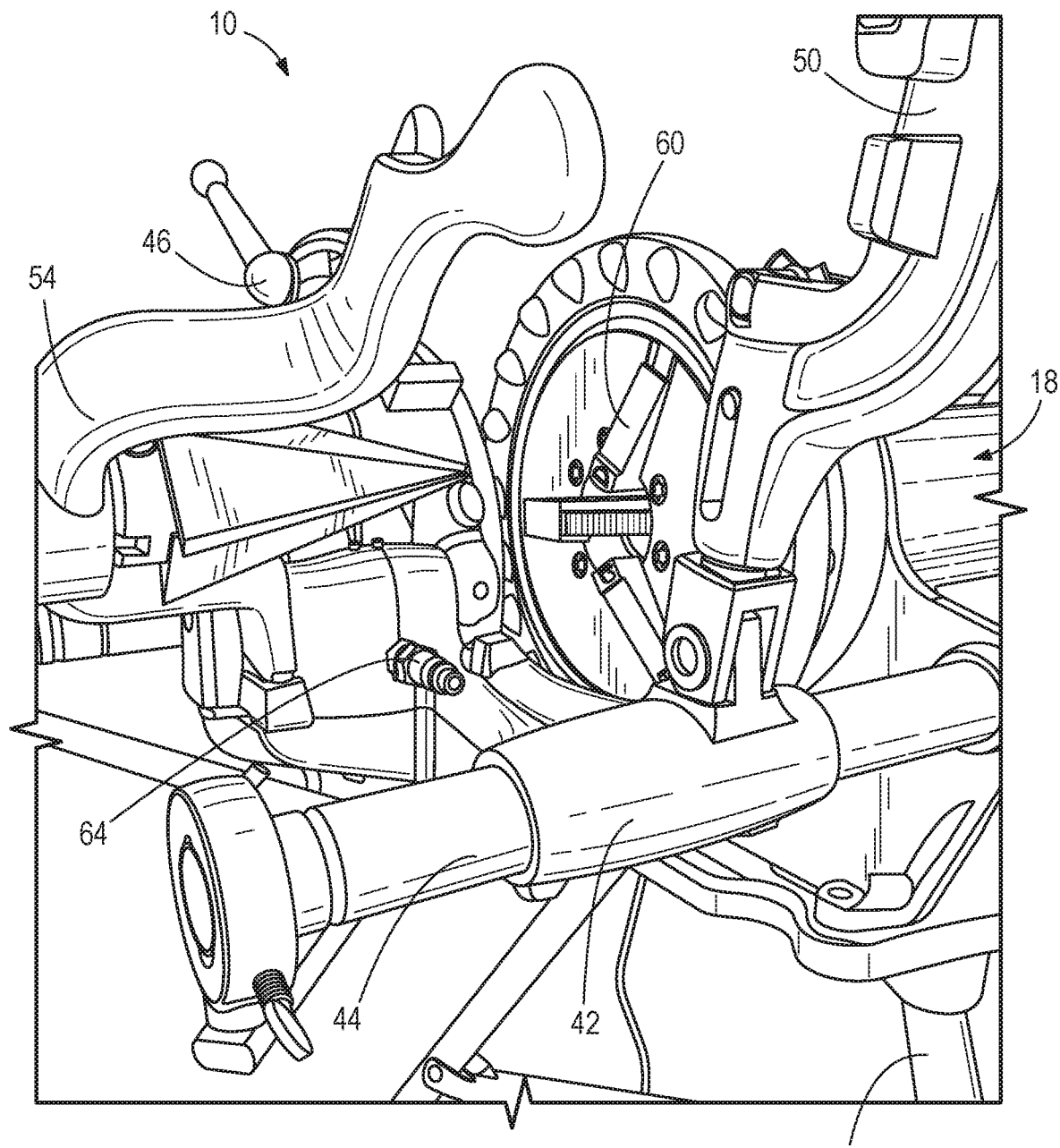
FIG. 5 is a perspective view of one of the pipe threaders of FIGS. 1-3 including a male quick-connect coupling to which a corresponding female quick-connect coupling of the lubrication system of FIG. 4 may be connected.

With reference to FIGS. 1 and 5, the portable pipe threader 10 further includes a spindle 60 in which the pipe 14 is clamped. The drive element 34 interconnects the spindle 60 and the output gear of the gear box 26. Thus, torque from the motor 22 is transferred to the spindle 60, causing it and the pipe 14 to rotate, via the gear box 26 and the drive element 34. With reference to FIG. 1, the plurality of pipe threading tools 46, 50, 54 includes a die holder 46 having a plurality of dies (not shown) to cut threads on the pipe 14, a cutter 50 to trim excess pipe 14, and a reamer 54 to smooth edges of the threaded or cut pipe 14. The plurality of pipe threading tools 46, 50, 54 remain stationary on the carriage 42 while the pipe 14 is rotated by the spindle 60. The portable pipe threader 10 also includes a lubricant port 64 (e.g., a male quick-connect coupling) configured to fluidly connect to a lubrication system 300 (FIG. 4) to provide lubricant during a threading, cutting, or reaming operation using, respectively, the die holder 46, the cutter 50, or the reamer 54.

Figure 2:
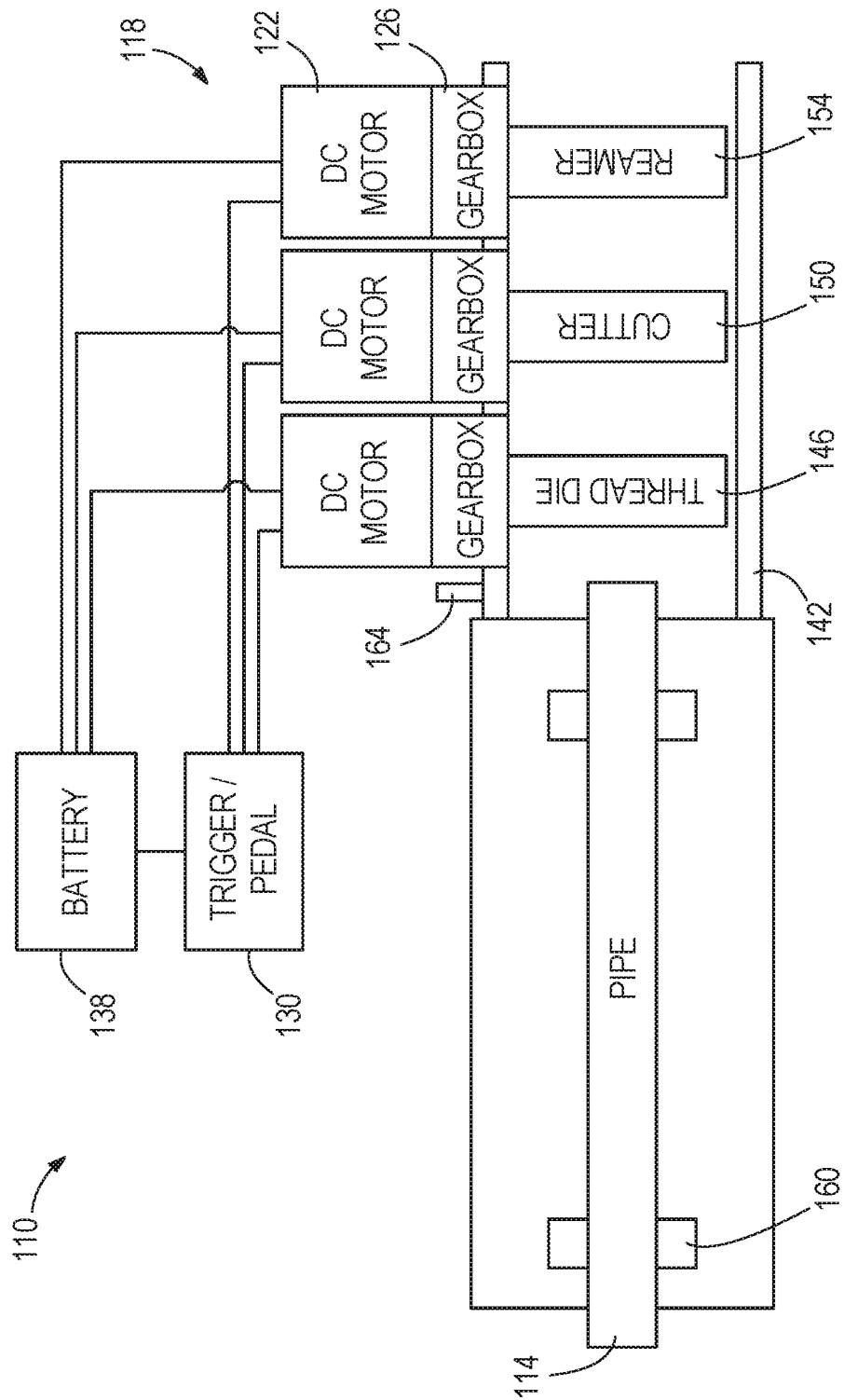
FIG. 2 is a top view of a portable pipe threader in accordance with another embodiment of the invention.

FIG. 2 illustrates a portable pipe threader 110 according to an alternative embodiment. Like components and features as the pipe threader 10 of FIG. 1 will be used plus "100". The portable pipe threader 110 includes a stand 68 (FIG. 5) and a carriage 142 supported by the stand 68. The pipe threader 110 includes a spindle 160 to which a pipe 114 is clamped and a plurality of pipe threading tools 146, 150, 154 supported by the carriage 142. However, rather than the spindle 160 being rotated, the pipe threader 110 includes a drive assembly 118 mounted to the carriage 142 with the pipe threading tools 146, 150, 154 for rotating the individual tools 146, 150, 154.

More specifically, the drive assembly 118 includes a plurality of motors 122, each having a corresponding gear box 126, to directly provide torque to each of the plurality of pipe threading tools 146, 150, 154 to rotate the tools 146, 150, 154 relative to the stationary pipe 160. The pipe threader 110 further includes a pedal 130 to selectively control the drive assembly 118. In particular, the pedal 130 is operable to activate any of the motors 122 and control a relative speed at which the pipe 114 and the selected one of the pipe threading tools 146, 150, 154 are rotated. The pipe threader also includes a battery pack 138 supported by the stand 68 (FIG. 5) in selective electrical communication with each of the motors 122 to provide electrical power thereto.

Figure 3:
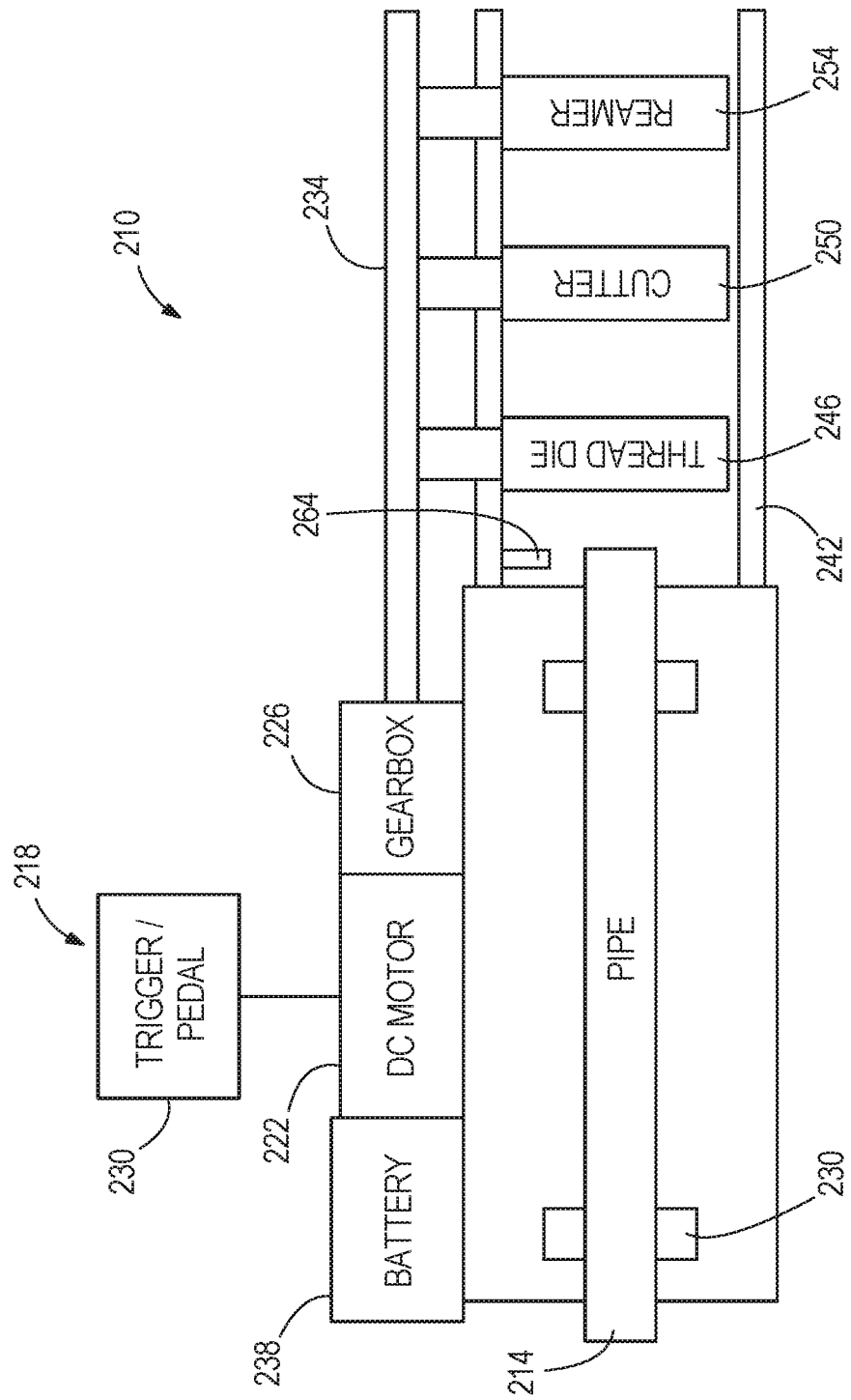
FIG. 3 is a top view of a portable pipe threader in accordance with yet another embodiment of the invention.

FIG. 3 illustrates a portable pipe threader 210 according to an alternative embodiment. Like components and features as the pipe threader 10 of FIG. 1 will be used plus "200". The portable pipe threader 210 includes a stand 68 (FIG. 5) and a carriage 242 supported by the stand 68. The pipe threader 210 includes a spindle 260 to which a pipe 214 is clamped and a plurality of pipe threading tools 246, 250, 256 supported by the carriage 242. However, rather than the spindle 260 being rotated, the pipe threader 210 includes a drive assembly 218 mounted to the stand 68 for selectively rotating one of the pipe threading tools 246, 250, 256.

More specifically, the drive assembly 218 includes a motor 222, a gear box 226 coupled to the motor having an output gear (not shown), a pedal 230 that selectively controls the drive assembly 218, and a battery pack 238 supported by the stand 68 in selective electrical communication with the motor 222 to provide electrical power to the motor 222. The drive assembly 218 further includes a common driveline 234 interconnecting the motor 222 and the plurality of pipe threading tools 246, 250, 254 for selectively providing torque from the motor 222 to one of the pipe threading tools 246, 250, 254. The pedal 230 is operable to activate the motor 222 and control a relative speed at which the pipe 214 and the selected one of the pipe threading tools 246, 250, 254 are rotated.

With reference to FIGS. 1 and 4, the lubricant ports 64, 164, 264 of any of the pipe threaders 10, 110, 210 shown in FIGS. 1-3 are configured to fluidly connect to a lubrication system 300 to receive lubricant therefrom. In some embodiments, the lubrication system 300 is separate and detachable from the threader 10. And, in other embodiments, the lubrication system 300 is integrated with the threader 10. As shown in FIG. 4, the lubrication system 300 includes a pump 330 (e.g. self-priming positive displacement) that draws lubricant from a tank 315 through a plurality of tubes 335. A battery pack 325, which is separate from any of the battery packs 38, 138, 238, provides electrical power to the pump 330. In other embodiments of the lubrication system 300, the pump 330 may receive electrical power from the same battery packs 38, 138, 238 powering the electric motors 22, 122, 222, respectively. The lubrication system 300 also includes a connector 310 (e.g., a female quick-disconnect coupling) downstream of the pump 330 to receive pressurized lubricant therefrom and a regulator valve 320 having an inlet in fluid communication with the tube 335 interconnecting the pump 330 and the connector 310, and an outlet in fluid communication with the tube 335 interconnecting the tank 315 and the pump 330. As such, during operation of the pump 330, the regulator 320 limits the flow of pressurized lubricant sent to the connector 310 by recirculating some of the pressurized lubricant to the inlet of the pump 330. As explained in further detail below, the connector 310 can fluidly connect the lubrication system 300 to either a hand-held lubrication system 400 (FIG. 4) or any of the lubricant ports 64, 164, 264 on the respective pipe threaders 10, 110, 210.

With continued reference to FIGS. 1 and 4, the hand-held lubrication system 400 includes a hand-operated pump 410 configured to apply lubricant to the pipe 14 (FIG. 1) as it is threaded, cut, or reamed, and a connector 420 (e.g., a male quick-connect coupling) capable of fluidly connecting to the corresponding connector 310 of the lubrication system 300 (FIG. 4). In this manner, the hand-operated pump 410 can be used to draw lubricant from the tank 315 while bypassing the pump 330. The hand-operated pump 410 can be used, for example, by an operator of the pipe threader 10 desiring manual control over when and where lubricant is provided to the pipe during a threading, cutting, or reaming operation. Alternatively, if the operator desires lubricant to be automatically applied to the pipe, the connector 310 of the lubrication system 300 can be attached to any of the connectors 64, 164, 264 of the respective pipe threaders 10, 110, 210, in which case the pump 330 is operated to provide pressurized lubricant to the pipe threaders 10, 110, 210 for discharge to the pipe through internal passageways in the pipe threaders 10, 110, 210. In other embodiments, the pump 330 may be used to provide a pressurized flow of lubricant to the pump 410, which could be used as a hand-held dispenser by the operator of the threader 10 to start and stop the flow of the lubricant, to manually direct the lubricant discharged from the pump 330 to the pipe.

Figure 6:
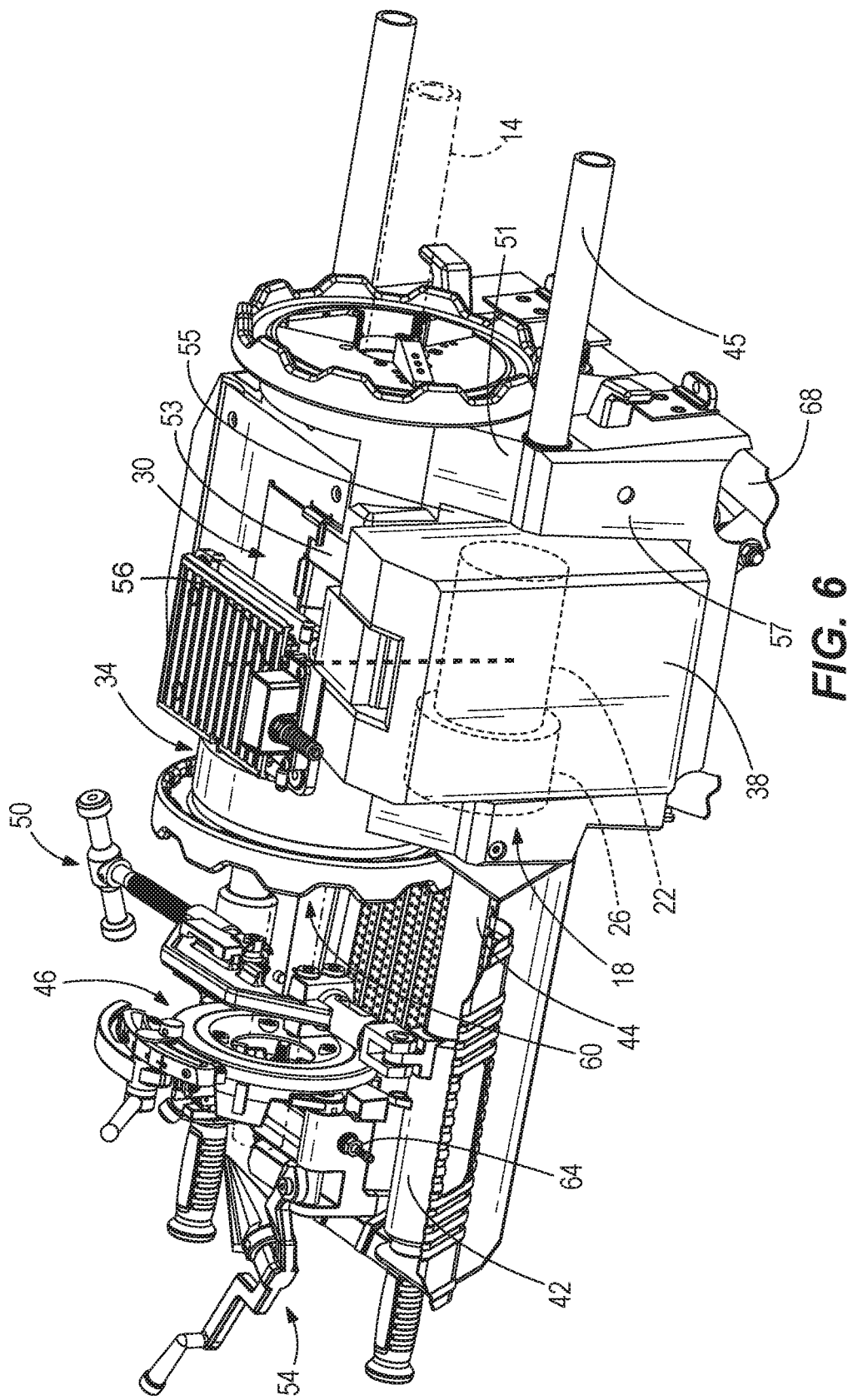
FIG. 6 is a perspective view of the pipe threader of FIG. 1.

With reference to FIG. 6, the pipe threader 10 includes a housing 51 in which the drive assembly 18 is located, a first set of guide rails 44 extending from a first end of the housing 51 in a first direction, and a second set of guide rails 45 extending from an opposite, second end of the housing 51 in a second direction. The first set of guide rails 44 is configured to support the carriage 42, which is slidable along the rails 44 to position the pipe threading tools 46, 50, 54 relative to the pipe 14. The housing 51 further includes a battery receptacle 53 recessed within the housing 51 and located on a side 57 of the housing 51 that is oriented parallel with the first and second set of guide rails 44, 45. The recessed battery receptacle 53 coincides with a gap 55 defined by the housing 51 between the first and second sets of guide rails 44, 45. The battery receptacle 53 defines a battery insertion axis 56 transverse to the first and second sets of guide rails 44, 45 along which the battery pack 38 is slidably received to electrically power the motor 22. When the battery pack 38 is connected to the battery receptacle 53, the battery pack 38 is partially recessed within the housing 51 and located within the gap 55 between the first and second sets of guide rails 44, 45.

In some embodiments of the pipe threader 10, the carriage 42 can alternatively be supported on the second set of guide rails 45 and slidable in the second direction.

Various features of the invention are set forth in the following claims.

What is claimed is:

1. A portable pipe threader comprising:
a stand upon which a pipe is supported;
a carriage supported by the stand;
a plurality of pipe threading tools coupled to the carriage and selectively operable to perform work on the pipe;
a drive assembly mounted to the stand including a brushless direct current motor operable to provide torque to one of the pipe or a selected one of the pipe threading tools to rotate the pipe and the selected one of the pipe threading tools relative to each other;
a housing in which at least a portion of the drive assembly is positioned;
a first set of straight, separate, elongated parallel guide rails upon which the carriage is slidable extending from a first end of the housing in a first direction;
a second set of straight, separate, elongated parallel guide rails extending from an opposite, second end of the housing in a second direction;
a battery receptacle located on the housing within a gap between the first and second sets of guide rails; and
a battery pack removably engaged with the battery receptacle and in selective electrical communication with the motor to provide electrical power to the motor.

2. The portable pipe threader of claim 1, wherein the drive assembly further includes a gearbox for receiving torque from the motor having an output gear, and a drive element rotatably driven by the output gear configured to transfer torque to one of the pipe or the selected one of the plurality of pipe threading tools to cause relative rotation therebetween.

3. The portable pipe threader of claim 2, wherein the drive element is a belt.

4. The portable pipe threader of claim 2, wherein the drive element is a common driveline configured to interconnect the motor and the pipe threading tools for selectively providing torque from the motor to one of the pipe threading tools.

5. The portable pipe threader of claim 1, further comprising an electronic speed selection switch configured to selectively activate the motor and control a relative speed at which one of the pipe or the selected one of the pipe threading tools are rotated.

6. The portable pipe threader of claim 5, wherein the electronic speed selection switch is a pedal.

7. The portable pipe threader of claim 1, wherein the pipe threading tools include a die holder having a plurality of dies to cut threads on the pipe, a cutter to trim excess pipe, and a reamer to smooth edges of a newly threaded or cut pipe.

8. The portable pipe threader of claim 1, further comprising a spindle configured to clamp the pipe and receive torque from the motor to rotate the spindle and the pipe relative to the pipe threading tools.

9. The portable pipe threader of claim 6, wherein, when the spindle and pipe rotate relative to the pipe threading tools, the pipe threading tools remain stationary on the carriage.

10. The portable pipe threader of claim 1, further comprising:
a lubricant port mounted on the carriage; and
a lubrication system fluidly connected to the lubricant port to provide lubricant to one of the pipe or one of the pipe threading tools.

11. The portable pipe threader of claim 1, wherein the battery receptacle defines a battery insertion axis along which the battery pack is slidable to connect the battery pack with the battery receptacle, and wherein the battery insertion axis is oriented transverse to the first and second sets of guide rails.

12. The portable pipe threader of claim 1, wherein the housing includes a side extending between the first and second ends, wherein the side of the housing is oriented parallel with the first and second sets of guide rails.

13. The portable pipe threader of claim 1, wherein the battery receptacle is recessed within the housing, and wherein the battery pack, when connected to the battery receptacle, is also at least partially recessed within the housing and located within the gap between the first and second sets of guide rails.

14. The portable pipe threader of claim 1, wherein the motor has a power output of at least 2760 W and a nominal outer diameter of up to 80 mm.

15. The portable pipe threader of claim 14, wherein the battery pack has a nominal voltage of up to 80 V.

16. A portable pipe threader comprising:
a stand upon which a pipe is supported;

a carriage supported by the stand having a lubrication port;

a plurality of pipe threading tools coupled to the carriage and selectively operable to perform work on the pipe;

a drive assembly mounted to the stand including a brushless direct current motor operable to provide torque to one of the pipe or a selected one of the pipe threading tools;

a housing in which at least a portion of the drive assembly is positioned, the housing including a battery receptacle;

a first set of straight, separate, elongated parallel guide rails upon which the carriage is slidable extending from a first end of the housing in a first direction;

a second set of straight, separate, elongated parallel guide rails extending from an opposite, second end of the housing in a second direction;

a lubrication system in selective fluid communication with the lubrication port for providing a lubricant to the pipe or the pipe threading tools; and a battery pack slidably received within the battery receptacle, wherein the battery pack is configured to provide electrical power to the motor and/or the lubrication system.

17. The portable pipe threader of claim 16, wherein the lubrication system further includes:

a tank for holding the lubricant, a pump configured to draw the lubricant from the tank, a connector downstream of the pump for fluidly connecting the lubrication system with the lubrication port, and a regulator valve configured to limit the flow of the lubricant to the connector by recirculating a portion of the lubricant back to the pump.

18. The portable pipe threader of claim 17, wherein the connector can alternatively fluidly connect the lubrication system to a hand-held lubrication system.

19. The portable pipe threader of claim 16, wherein the drive assembly further includes a gearbox for receiving torque from the motor having an output gear, and a drive element rotatably driven by the output gear configured to transfer torque to one of the pipe or the selected one of the pipe threading tools to cause relative rotation therebetween.

20. The portable pipe threader of claim 16, wherein the pipe threading tools include a die holder having a plurality of dies to cut threads on the pipe, a cutter to trim excess pipe, and a reamer to smooth edges of a newly threaded or cut pipe.

21. The portable pipe threader of claim 16, further comprising an electronic speed selection switch configured to selectively activate the motor and control a relative speed at which one of the pipe or the selected one of the pipe threading tools are rotated.

* * * * *